US010197856B2

(12) United States Patent
Ohtake et al.

(10) Patent No.: US 10,197,856 B2
(45) Date of Patent: Feb. 5, 2019

(54) OPTICAL MODULATOR AND DISPLAY DEVICE

(71) Applicant: SHARP KABUSHIKI KAISHA, Sakai, Osaka (JP)

(72) Inventors: Tadashi Ohtake, Sakai (JP); Tomoko Teranishi, Sakai (JP); Hiroyuki Moriwaki, Sakai (JP); Eiji Satoh, Sakai (JP); Hao Li, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/564,179

(22) PCT Filed: Mar. 28, 2016

(86) PCT No.: PCT/JP2016/059795
§ 371 (c)(1),
(2) Date: Oct. 3, 2017

(87) PCT Pub. No.: WO2016/158814
PCT Pub. Date: Oct. 6, 2016

(65) Prior Publication Data
US 2018/0129086 A1 May 10, 2018

(30) Foreign Application Priority Data

Apr. 3, 2015 (JP) .................................. 2015-077058

(51) Int. Cl.
*G02F 1/1337* (2006.01)
*G02F 1/1343* (2006.01)
(Continued)

(52) U.S. Cl.
CPC ............ *G02F 1/1337* (2013.01); *G02F 1/137* (2013.01); *G02F 1/1343* (2013.01);
(Continued)

(58) Field of Classification Search
CPC ..................................................... G02F 1/1337
See application file for complete search history.

(56) References Cited

U.S. PATENT DOCUMENTS

| 5,540,768 A | 7/1996 | Yamamoto et al. |
| 6,665,042 B1 | 12/2003 | Marshall et al. |

(Continued)

FOREIGN PATENT DOCUMENTS

| JP | 6-267731 A | 9/1994 |
| JP | 6-313880 A | 11/1994 |

(Continued)

*Primary Examiner* — Sang V Nguyen
(74) *Attorney, Agent, or Firm* — ScienBiziP, P.C.

(57) ABSTRACT

The present invention provides an optical modulator that prevents aggregation of shape-anisotropic particles. The optical modulator of the present invention includes: (1) a first substrate and a second substrate that are disposed to face each other; (2) an optical modulation layer disposed between the first substrate and the second substrate; and (3) a vertical alignment film. The optical modulation layer (2) contains: (2A) liquid crystal molecules that have a positive anisotropy of dielectric constant with a value of the anisotropy Δε of 10 or more; and (2B) shape-anisotropic particles each including a core material and a coating layer that is formed of a material containing a fluorine atom and constitutes an outer surface of the shape-anisotropic particles. The first substrate includes a pair of electrodes. The liquid crystal molecules and the shape-anisotropic particles are aligned perpendicular to the first substrate with no voltage applied to the electrodes and are tilted parallel to the first substrate by a transverse electric field generated by application of voltage to the electrodes. The liquid crystal molecules have a surface energy in the range of 27 to 35 mN/m. The vertical alignment film has a surface energy in the range of 30 to 40 mN/m.

8 Claims, 6 Drawing Sheets

(51) Int. Cl.
*G02F 1/1368* (2006.01)
*G02F 1/137* (2006.01)
*G02F 1/167* (2006.01)
*G02F 1/19* (2006.01)
*G02F 1/17* (2006.01)

(52) U.S. Cl.
CPC ........ *G02F 1/1368* (2013.01); *G02F 1/13725* (2013.01); *G02F 1/167* (2013.01); *G02F 1/19* (2013.01); *G02F 1/134363* (2013.01); *G02F 1/17* (2013.01); *G02F 2001/13706* (2013.01); *G02F 2001/133742* (2013.01)

(56) References Cited

U.S. PATENT DOCUMENTS

| | | | |
|---|---|---|---|
| 6,829,075 | B1 | 12/2004 | Kosc et al. |
| 2005/0020699 | A1 | 1/2005 | Isobe et al. |
| 2006/0066011 | A1* | 3/2006 | Oya ......... B29D 7/01 264/330 |
| 2007/0159678 | A1 | 7/2007 | Verhaegh et al. |
| 2013/0169899 | A1* | 7/2013 | Tsuda ........ G02F 1/134363 349/42 |
| 2014/0211115 | A1* | 7/2014 | Iwamoto ...... G02F 1/13306 349/33 |
| 2014/0224322 | A1* | 8/2014 | Takeda ........ H01L 51/445 136/256 |
| 2014/0333991 | A1 | 11/2014 | Satoh et al. |
| 2015/0043053 | A1 | 2/2015 | Satoh et al. |
| 2015/0103300 | A1* | 4/2015 | Kim ............ C09K 19/586 349/123 |
| 2015/0192807 | A1* | 7/2015 | Satoh ........... G02F 1/167 349/123 |
| 2016/0085096 | A1* | 3/2016 | Moriwaki ....... G02F 1/1337 349/43 |
| 2016/0200980 | A1* | 7/2016 | Yano ............ C07C 23/18 252/299.61 |
| 2016/0357077 | A1* | 12/2016 | Niiyama ....... G02F 1/134363 |
| 2017/0031186 | A1* | 2/2017 | Moriwaki ...... G02F 1/13725 |
| 2017/0108740 | A1* | 4/2017 | Kim ............ G02F 1/1341 |
| 2017/0153370 | A1* | 6/2017 | Maruyama ...... G02B 5/3016 |

FOREIGN PATENT DOCUMENTS

| | | |
|---|---|---|
| JP | 7-133440 A | 5/1995 |
| JP | 8-262453 A | 10/1996 |
| JP | 8-283603 A | 10/1996 |
| JP | 2003-253154 A | 9/2003 |
| JP | 2003-533736 A | 11/2003 |
| JP | 2004-10735 A | 1/2004 |
| JP | 2006-235484 A | 9/2006 |
| JP | 2007-506152 A | 3/2007 |
| JP | 2010-122306 A | 6/2010 |
| JP | 2013-129778 A | 7/2013 |
| WO | 2013/108899 A1 | 7/2013 |
| WO | 2013/141248 A1 | 9/2013 |
| WO | 2015/152008 A1 | 10/2015 |

\* cited by examiner (a)

(b)

(a)

(b)

(a)

(b)

OPTICAL MODULATOR AND DISPLAY DEVICE

TECHNICAL FIELD

The present invention relates to optical modulators and display devices. Specifically, the present invention relates to an optical modulator that modulates light by controlling the alignment of shape-anisotropic particles dispersed in liquid crystal, and a display device.

BACKGROUND ART

Liquid crystal panels utilizing polarizers are well known as optical modulators. Such a liquid crystal panel controls the transmittance of light incident on the liquid crystal panel by converting natural light before being incident on a liquid crystal layer into polarized light using a polarizer and then causing the polarized light passing through the liquid crystal layer to enter the same polarizer (in the case of a reflective mode) or another polarizer (in the case of a transmissive mode). A liquid crystal layer can be utilized in polarization control because the alignment of liquid crystal molecules in the liquid crystal layer varies according to the voltage applied. In such a liquid crystal panel, however, half or more of the light used for display is absorbed by the polarizer, which unfortunately puts a limit on increase in light use efficiency.

In order to deal with this problem, optical modulators requiring no polarizer, such as those disclosed in Patent Literatures 1 to 8, have been developed. Patent Literature 1 discloses an optical device wherein a system containing electro-optically sensitive flakes suspended in a fluid host is encapsulated in a polymeric binder solution. Patent Literature 2 discloses a display medium containing scaly magnetic powder dispersed in a liquid in microcapsules surrounded by a binder. Patent Literature 3 discloses an electrochemical display element comprising, between two electrode plates, an ionic conductor containing fine particles of a specific organic polymer and an electrolyte held in the polymer fine particles. Patent Literatures 4 and 5 each disclose an optical modulation panel comprising an optical modulation layer that contains a shape-isotropic member. Patent Literatures 6 and 7 each disclose an optical device including a suspension layer containing polymer flakes. Patent Literature 8 discloses a transflective display including a suspension layer that contains reflective particles.

Meanwhile, surface modification of particles has been studied in the field of paints, for example. Examples of known techniques include those disclosed in Patent Literatures 9 to 16.

CITATION LIST

Patent Literature

Patent Literature 1: JP 2003-533736 T
Patent Literature 2: JP H06-313880 A
Patent Literature 3: JP 2006-235484 A
Patent Literature 4: WO 2013/108899
Patent Literature 5: WO 2013/141248
Patent Literature 6: U.S. Pat. No. 6,665,042 B
Patent Literature 7: U.S. Pat. No. 6,829,075 B
Patent Literature 8: JP 2007-506152 T
Patent Literature 9: JP H07-133440 A
Patent Literature 10: JP H08-283603 A
Patent Literature 11: JP 2013-129778 A
Patent Literature 12: JP 2010-122306 A
Patent Literature 13: JP 2004-010735 A
Patent Literature 14: JP 2003-253154 A
Patent Literature 15: JP H08-262453 A
Patent Literature 16: JP H06-267731 A

SUMMARY OF INVENTION

Technical Problem

The inventors have made various studies on an optical modulator that is suited for increase in light use efficiency and requires no polarizer. As a result, the inventors have focused on a display system in which shape-anisotropic particles are activated by voltage application. The inventors have then found that, since the alignment in liquid crystal varies according to the voltage applied, the alignment of the shape-anisotropic particles in this display system can be controlled by using liquid crystal as a dispersion medium for shape-anisotropic particles. In the case of using liquid crystal as a medium, however, shape-anisotropic particles were found to easily aggregate. The display system can therefore still be improved from this viewpoint. Aggregation of shape-anisotropic particles in the case where the optical modulator is a display device deteriorates display characteristics such as a reflectance (in the case of a reflective display device), a transmittance (in the case of a transmissive display device) and a response speed. In addition, aggregation of shape-anisotropic particles proceeds as time passes to cause deterioration with time of the display quality.

The present invention has been made in view of such a current state of the art and aims to provide an optical modulator that prevents aggregation of shape-anisotropic particles, and a display device including the optical modulator.

Solution to Problem

In the course of study on the method for preventing aggregation of shape-anisotropic particles dispersed in a liquid crystal medium, the inventors have found that it is important to align the liquid crystal parallel to the surfaces of shape-anisotropic particles so as to vertically align both the liquid crystal and the shape-anisotropic particles in the initial state (state in which no voltage is applied). That is, aggregation of shape-anisotropic particles in conventional techniques was found to be due to a difference in alignment between liquid crystal aligned perpendicular to the surfaces of shape-anisotropic particles in the vicinity of the shape-anisotropic particles and liquid crystal aligned perpendicular to the substrate surfaces at distances from the shape-anisotropic particles. The inventors have therefore made studies on the method of aligning liquid crystal parallel to the surfaces of shape-anisotropic particles. However, the experiments revealed that the known FCK rule is not applicable in the case of using liquid crystal having an anisotropy $\Delta\varepsilon$ of dielectric constant of 10 or more. The inventors have then made intensive studies on a combination of shape-anisotropic particles and liquid crystal that aligns parallel to the surfaces of the shape-anisotropic particles, and have found a satisfactory combination. Accordingly, the inventors have found a solution to the above problems, completing the present invention.

One aspect of the present invention may be an optical modulator, including: a first substrate and a second substrate that are disposed to face each other; an optical modulation layer disposed between the first substrate and the second substrate; and a vertical alignment film disposed on an optical modulation layer side surface of at least one of the first substrate and the second substrate, the optical modulation layer containing shape-anisotropic particles and liquid crystal molecules that have a positive anisotropy of dielectric constant with a value of the anisotropy Δε of 10 or more, the shape-anisotropic particles each including a core material and a coating layer that is formed of a material containing a fluorine atom and constitutes an outer surface of the shape-anisotropic particles, the first substrate including a pair of electrodes, the liquid crystal molecules and the shape-anisotropic particles being aligned perpendicular to the first substrate with no voltage applied to the electrodes and being tilted parallel to the first substrate by a transverse electric field generated by application of voltage to the electrodes, the liquid crystal molecules having a surface energy in the range of 27 to 35 mN/m, the vertical alignment film having a surface energy in the range of 30 to 40 mN/m.

Another aspect of the present invention may be a display device including the above optical modulator.

In contrast, none of the optical modulators disclosed in Patent Literatures 1 to 8 utilizes a combination of shape-anisotropic particles and liquid crystal that has an anisotropy Δε of dielectric constant of 10 or more and is capable of being aligned parallel to the surfaces of the shape-anisotropic particles.

In addition, the surface modification techniques disclosed in Patent Literatures 9 to 16 are used in the field of paints, for example, and are not developed for shape-anisotropic particles used in optical modulators. Also, none of these patent literatures considered improvement of dispersion stability of shape-anisotropic particles in liquid crystal having an anisotropy Δε of dielectric constant of 10 or more.

Advantageous Effects of Invention

The optical modulator of the present invention having the above configuration can prevent aggregation of shape-anisotropic particles. The display device of the present invention, including the above optical modulator, can prevent deterioration of display characteristics such as a reflectance (in the case of a reflective display device), a transmittance (in the case of a transmissive display device) and a response speed, which are caused by aggregation of shape-anisotropic particles.

BRIEF DESCRIPTION OF DRAWINGS

FIG. 1(a) illustrates a voltage-off state and FIG. 1(b) illustrates a voltage-on state.

FIG. 4(a) illustrates the initial dispersion state and FIG. 4(b) illustrates a state some time after the dispersion.

FIG. 6(a) illustrates a voltage-off state and FIG. 6(b) illustrates a voltage-on state.

DESCRIPTION OF EMBODIMENTS

The present invention is not limited to the following embodiments and examples, and can appropriately be modified within the scope of the present invention. In the following description, members having the same or similar functions in different drawings are commonly provided with the same reference sign so as to avoid repetition of description.

Although the case of applying the optical modulator to a display device (flake display) is described in the following embodiments, the optical modulator of the present invention is applicable not only to display devices but also to, for example, display windows, window shades, and frosted glass whose turbidity is adjustable.

Embodiment 1

An optical modulator of Embodiment 1 constitutes a reflective display device that provides display by utilizing reflection of light (external light) incident on the device from the outside of the device. The optical modulator provides black display with no voltage applied and provides white display or half-tone display (gray-scale display) with voltage applied. The optical modulator of Embodiment 1 includes pixels arranged in a matrix form and is configured to be switchable between the black display and the half-tone or white display in each pixel.

Figure 1:
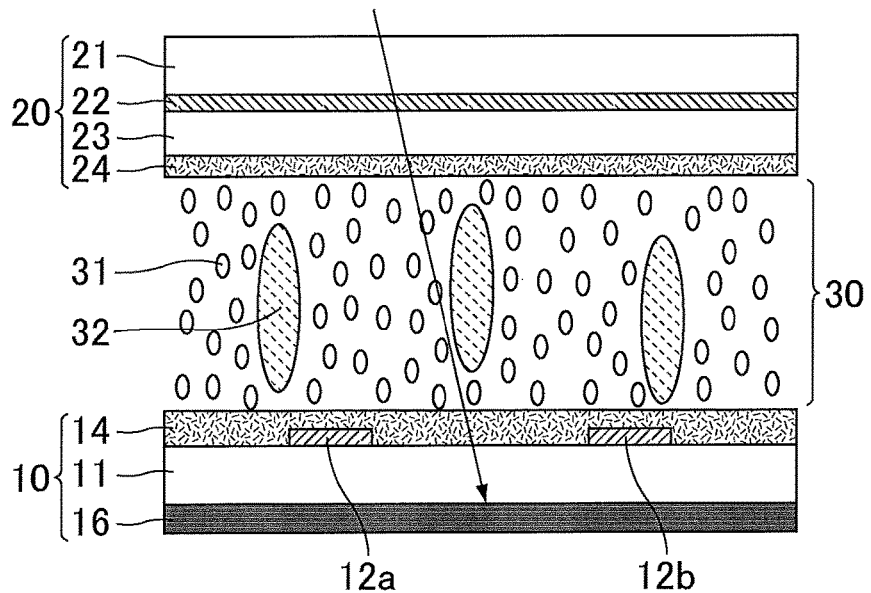
FIGS. 1(a) and 1(b) are each a schematic cross-sectional view of an optical modulator of Embodiment 1.
Figure 1:
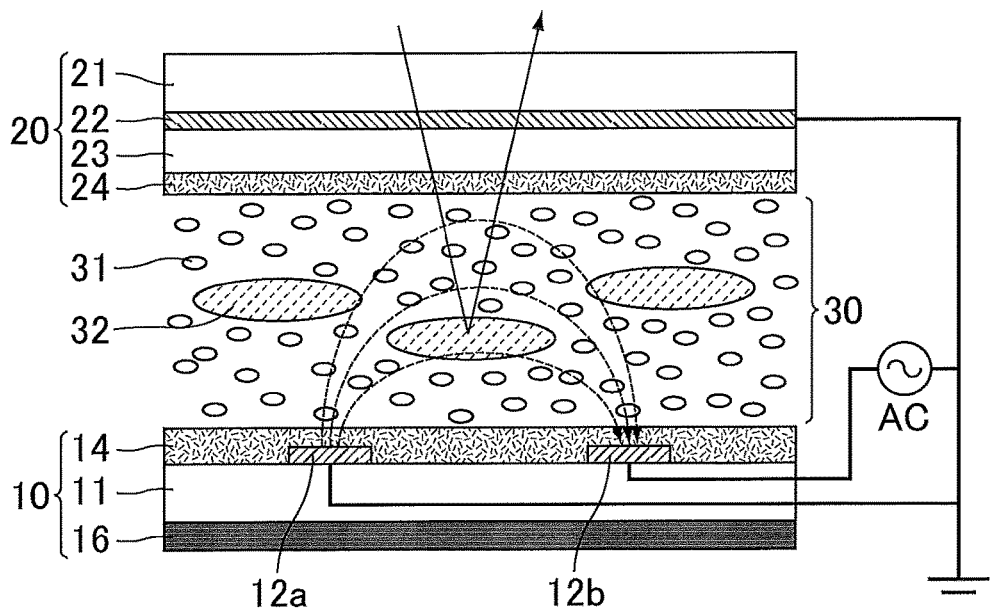
Figure 2:
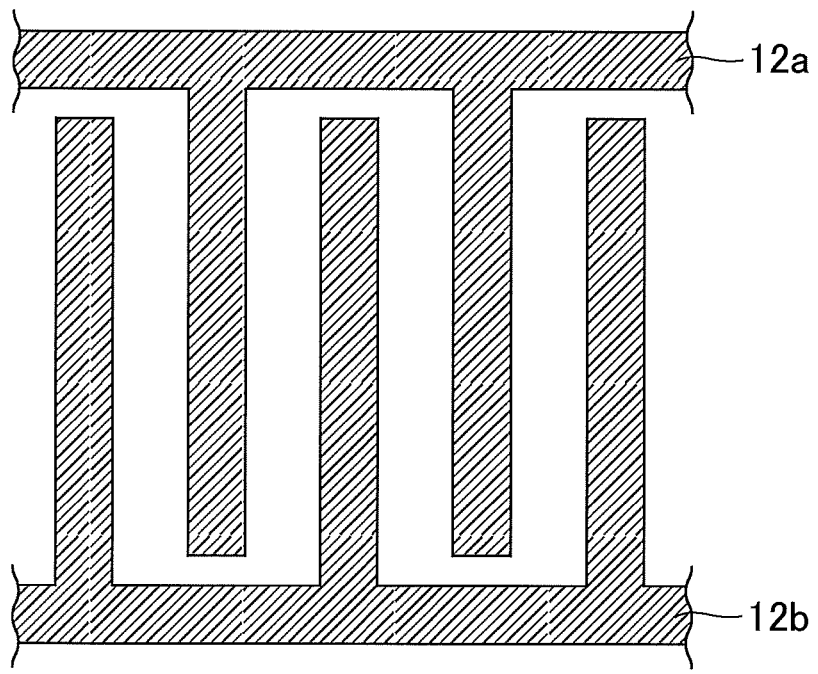
FIG. 2 is a schematic plan view of an electrode structure provided in the optical modulator of Embodiment 1.

The overall configuration of the optical modulator of Embodiment 1 is described with reference to FIGS. 1(a) and 1(b) and FIG. 2. FIGS. 1(a) and 1(b) are schematic cross-sectional views of the optical modulator of Embodiment 1; FIG. 1(a) illustrates a voltage-off state and FIG. 1(b) illustrates a voltage-on state. FIG. 2 is a schematic plan view of an electrode structure provided in the optical modulator of Embodiment 1.

The optical modulator of Embodiment 1 includes a first substrate 10 and a second substrate 20 that are disposed to face each other, and a liquid crystal layer 30 serving as an optical modulation layer between the substrates. The first substrate 10 is placed on the back surface side and the second substrate 20 is placed on the front surface side (display surface side, viewer side). The first substrate 10 and the second substrate 20 are attached to each other by a sealant (not illustrated) disposed to surround a display region. The space surrounded by the sealant between the first substrate 10 and the second substrate 20 is filled with the liquid crystal layer 30. The liquid crystal layer 30 may have any thickness.

The first substrate 10 includes a pair of electrodes 12a and 12b and a vertical alignment film 14 in the given order on the liquid crystal layer side (display surface side) of a supporting substrate 11, and includes a light absorber (light-absorbing layer) 16 on the back surface side of the supporting substrate 11. The first substrate 10 is an active matrix substrate and includes switching elements arranged in the respective pixels and various conductive lines, though they are not illustrated. Examples of the switching elements include thin-film transistors (TFTs). Examples of the various conductive lines include gate bus lines supplying scanning signals to the TFTs, source bus lines supplying display signals to the TFTs, and common lines. The pair of electrodes 12a and 12b is provided in each pixel, and one of the electrodes is electrically connected to a source bus line via the corresponding switching element while the other is electrically connected to a common line.

The pair of electrodes 12a and 12b has an in-plane switching (IPS) electrode structure, which is specifically a pair of comb electrodes whose teeth fit each other. As illustrated in FIG. 2, each of the electrodes 12a and 12b includes a trunk part and parallel branch parts (comb teeth) extending from the trunk part, and the branch parts of the electrodes are alternately arranged at a certain distance (with a certain space) from each other. Applying voltage between the electrodes 12a and 12b using an AC power supply produces electric fields (transverse electric fields) parallel to the first substrate 10 in the vicinity of the spaces in the liquid crystal layer 30.

The pair of electrodes 12a and 12b is formed of a conductive material such as a metal material. Since the optical modulator of the present embodiment provides display by utilizing reflection of external light, the electrodes in the first substrate 10, which are disposed closer to the back surface than the liquid crystal layer 30 is, may not be formed of a transparent conductive material.

The vertical alignment film 14 is disposed to cover at least the entire display region. That is, the initial alignment of liquid crystal molecules 31 is set to be perpendicular to the first substrate 10. The vertical alignment film 14 may be any alignment film that aligns the liquid crystal molecules 31 in the liquid crystal layer 30 substantially perpendicular to its surface.

The light absorber 16 absorbs external light passing through the liquid crystal layer 30 so as to achieve black display. The light absorber 16 may be formed of any material that can absorb light, such as a resin in which a black pigment is dispersed. As described above, the optical modulator of the present embodiment constitutes a reflective display device and provides, with no voltage applied, black display by utilizing the light absorber 16 to absorb external light passing through the liquid crystal layer 30 while providing, with voltage applied, white or half-tone display by utilizing shape-anisotropic particles 32 tilted horizontally by the transverse electric fields to reflect external light. Although the light absorber 16 is provided on the back surface side of the supporting substrate 11 as illustrated in FIGS. 1(a) and 1(b), the light absorber 16 may be provided on the front surface side of the supporting substrate 11.

The second substrate 20 includes a counter electrode 22, an insulating film 23, and a vertical alignment film 24 in the given order on the liquid crystal layer side (back surface side) of a supporting substrate 21. In the case of providing color display, the second substrate 20 further includes color filters. The optical modulator of the present embodiment basically provides display by utilizing transverse electric fields alone, and thus may not include the counter electrode 22.

The counter electrode 22 faces the pairs of electrodes 12a and 12b, but may not be provided separately in each of the pixels. The counter electrode 22 in the present embodiment has a planar shape to cover the entire display region formed by a large number of pixels. The counter electrode 22 enables generation of vertical electric fields in the liquid crystal layer 30. The optical modulator of the present embodiment can be driven by electric fields including vertical electric fields as necessary for purposes such as resetting hysteresis, resetting flake alignment disorder caused by external damage or any other factor, or electric field assistance for high-speed response.

The counter electrode 22 is preferably formed of a transparent conductive material. Examples of the transparent conductive material include indium tin oxide (ITO) and indium zinc oxide (IZO).

The insulating film 23 provided together with the counter electrode 22 can generate an electric field effectively in the liquid crystal layer 30 in white display.

The vertical alignment film 24 in the second substrate 20 is provided in a similar manner to that of the vertical alignment film 14 in the first substrate 10.

The liquid crystal layer 30 contains the shape-anisotropic particles 32 dispersed in liquid crystal. With use of liquid crystal as a dispersion medium for the shape-anisotropic anisotropic particles 32, the alignment of the shape-anisotropic particles 32 can be controlled by utilizing alignment change in liquid crystal. The liquid crystal molecules 31 and the shape-anisotropic particles 32 constituting the liquid crystal are realigned in the liquid crystal layer 30 by the transverse electric fields generated between the electrodes 12a and 12b in the first substrate 10. Since the present embodiment employs the liquid crystal molecules 31 having a positive anisotropy of dielectric constant, the liquid crystal molecules 31 and the shape-anisotropic particles 32 can be tilted horizontally by the transverse electric fields.

The liquid crystal molecules 31 have an anisotropy $\Delta\varepsilon$ of dielectric constant, defined by the following formula (1), of 10 or more. This configuration imparts a sufficient response speed to the optical modulator. The configuration can also reduce the threshold voltage, thereby reducing the power consumption by the optical modulator. The anisotropy $\Delta\varepsilon$ of dielectric constant is preferably 25 or less. In general, liquid crystal having an anisotropy $\Delta\varepsilon$ of more than 25 tends to contain impurities and tends to involve high cost because such liquid crystal is not used widely.

$$\Delta\varepsilon = (\text{dielectric constant } \varepsilon_{//} \text{ in the long axis direction}) - (\text{dielectric constant } \varepsilon_{\perp} \text{ in the short axis direction}) \quad (1)$$

Figure 3:
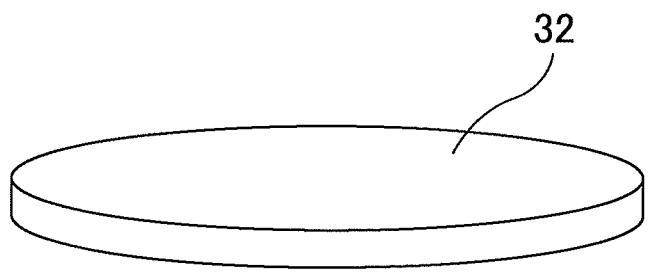
FIG. 3 is a schematic perspective view of one example of a disc-like shape-anisotropic particle.

The shape-anisotropic particles 32 may be any particles each having an anisotropic shape, but are preferably particles each having a shape with a projected area that continuously varies between the projected area on the first substrate 10 in the vertical alignment and the projected area on the first substrate 10 in the horizontal alignment according to the tilt of the particle. Specific examples of such a preferred shape include slice shapes (flake shapes), and disc-like shapes are particularly preferred. FIG. 3 is a schematic perspective view of one example of a disc-like shape-anisotropic particle. The projected area on the first substrate 10 in the horizontal alignment is preferably twice or more the projected area on the first substrate in the vertical alignment. The shape-anisotropic particles 32 preferably have an average maximum length as primary particles (non-aggregated particles) in the range of 3 to 20 µm. Although the shape-anisotropic particles 32 as the primary particles may have any thickness, a smaller thickness is more preferred to achieve a smaller projected area on the first substrate 10 in the vertical alignment. The thickness is preferably, for example, equal to or smaller than the wavelength of light (for example, 500 nm or smaller). In addition, the shape-anisotropic particles 32 each preferably have a light reflective surface.

The shape-anisotropic particles 32 in the present embodiment are preferably dispersed in the liquid crystal layer 30 at a density of 500 particles/4 mm$^2$ or higher. Here, the density of the shape-anisotropic particles 32 is a value obtained by projecting the particles on a surface of the first substrate 10. That is, the density corresponds to a measured value in a view of the surface of the first substrate 10 from the normal direction of the surface. Also, the density of the shape-anisotropic particles 32 is an index value showing the degree of dispersion, and aggregated or superimposed shape-anisotropic particles 32 which appear as a mass is counted as one particle. The density measurement of the shape-anisotropic particles 32 needs to be performed with a magnification that allows observation of the individual non-aggregated shape-anisotropic particles 32, and a 10× optical microscope would suffice for visual measurement. Also, the density of the shape-anisotropic particles 32 is measured when the liquid crystal layer 30 is in a steady state with no voltage applied (for example, 24 hours after the latest voltage application).

With the shape-anisotropic particles 32 being dispersed in the liquid crystal layer 30 at a density of 500 particles/4 mm$^2$ or higher, decrease in the reflectance and response speed caused by aggregation of the shape-anisotropic particles 32 can be effectively prevented, and degradation with time of the reflection performance can also be effectively prevented. The density of the shape-anisotropic particles 32 is preferably in the range of 700 to 1600 particles/4 mm$^2$. Too high a density of the shape-anisotropic particles 32 may cause local aggregation of the shape-anisotropic particles 32.

Figure 4:
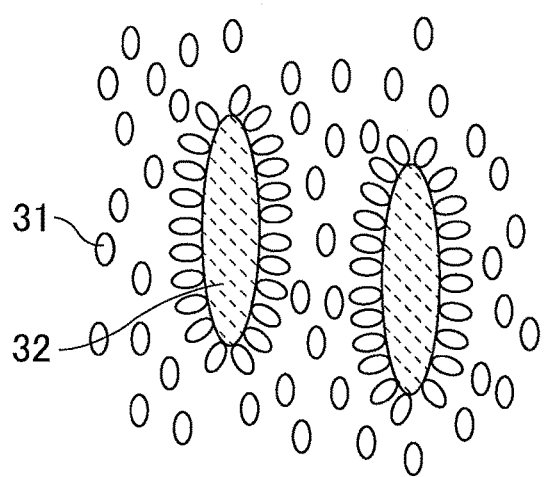
FIGS. 4(a) and 4(b) each schematically illustrate a dispersion state of conventional shape-anisotropic particles.
Figure 4:
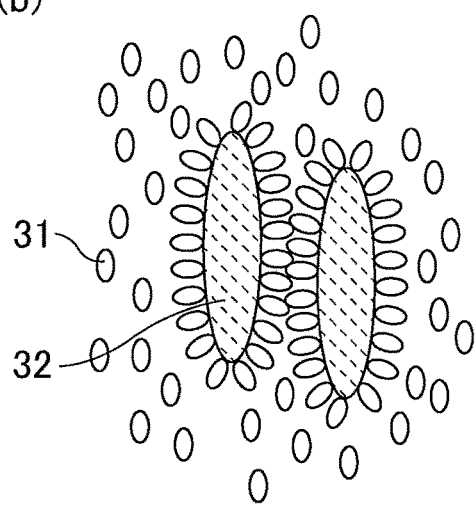

FIGS. 4(a) and 4(b) each schematically illustrate a dispersion state of conventional shape-anisotropic particles; FIG. 4(a) illustrates the initial dispersion state and FIG. 4(b) illustrates a state some time after the dispersion. As illustrated in FIGS. 4(a) and 4(b), the conventional shape-anisotropic particles 32, even if well dispersed in liquid crystal immediately after being mixed with the liquid crystal, are likely to aggregate with time. The studies made by the inventors revealed that such aggregation proceeds through the following mechanism.

In a system employing the conventional shape-anisotropic particles 32, the liquid crystal molecules 31 are aligned perpendicular to the surfaces of the shape-anisotropic particles 32. Meanwhile, at positions away from the shape-anisotropic particles 32, the liquid crystal molecules 31 are aligned perpendicular to the surfaces of the substrates. As a result, the alignment of the liquid crystal molecules 31 in the vicinity of the shape-anisotropic particles 32 is different from the alignment of the liquid crystal molecules 31 in the bulk liquid crystal which are not in the vicinity of the shape-anisotropic particles 32, causing an alignment defect at the interfaces between the molecules. In such a system employing the liquid crystal molecules 31, the alignment in the whole system naturally varies to fix the alignment defect, which unfortunately involves gradual aggregation of the shape-anisotropic particles 32.

Aggregation of the shape-anisotropic particles 32 in the case where the optical modulator is applied to a display device causes deterioration of display characteristics. In other words, aggregates of the shape-anisotropic particles 32 are heavier than separated shape-anisotropic particles 32, and therefore decrease the response speed. Also, aggregation increases the projected area on the first substrate 10 in the vertical alignment. The aggregates therefore tend to reflect light not only in the horizontal alignment but also in the vertical alignment, which may result in point defects on the display screen. Furthermore, uneven distribution of the shape-anisotropic particles 32 due to aggregation may produce regions with an insufficient number of the shape-anisotropic particles 32 in the liquid crystal layer 30, causing display unevenness due to in-plane uneven distribution of the shape-anisotropic particles 32.

Figure 5:
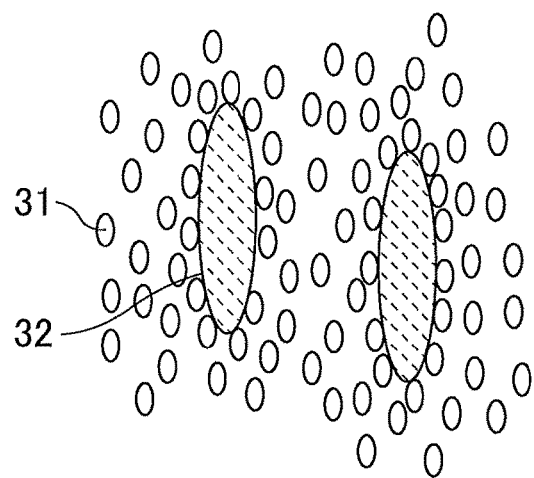
FIG. 5 schematically illustrates a dispersion state of the shape-anisotropic particles in the present invention.

FIG. 5 schematically illustrates a dispersion state of the shape-anisotropic particles in the present invention. In a system employing the shape-anisotropic particles 32 in the present invention, the liquid crystal molecules 31 are aligned parallel to the surfaces of the shape-anisotropic particles 32. Thereby, the alignment of the liquid crystal molecules 31 in the vicinity of the shape-anisotropic particles 32 and the alignment of the liquid crystal molecules 31 in the bulk liquid crystal not in the vicinity of the shape-anisotropic particles 32, both of which are vertical alignments, conform to each other, causing no alignment defect. The shape-anisotropic particles are therefore stably dispersed without aggregation with time at a dispersion density of 500 particles/4 mm$^2$ or higher. Hence, no degradation of display characteristics occurs.

The dispersion density of the shape-anisotropic particles 32 can be adjusted by the surface energies of the vertical alignment films 14 and 24, the liquid crystal molecules 31, and the shape-anisotropic particles 32. In order to adjust the dispersion density, the surface energy of each of the vertical alignment films 14 and 24 is adjusted in the range of 30 to 40 mN/m, while the surface energy of the liquid crystal molecules 31 is adjusted in the range of 27 to 35 mN/m. With surface energies within these respective ranges, any typical liquid crystal molecules can be used as the liquid crystal molecules 31 having an anisotropy Δε of dielectric constant of 10 or more, and an appropriate relationship is achieved between these surface energies and the surface energy of the shape-anisotropic particles 32. In order to adjust the dispersion density, the shape-anisotropic particles 32 preferably have a surface energy of 30 mN/m or lower, more preferably 20 mN/m or lower, still more preferably 15 mN/m or lower. The surface energy of the shape-anisotropic particles 32 can be adjusted by fluorinating the particle surfaces, for example.

The surface energy as used herein refers to a critical surface energy (critical value derived from the measured value) and can be determined by Zisman plotting.

As to the alignment of the liquid crystal molecules 31, there is a known rule called Friedel-Creagh-Kmetz rule (FCK rule). The FCK rule says that the following inequalities hold wherein γLC represents the surface energy of the liquid crystal and γPI represents the surface energy of the alignment film.

(FCK rule)
γLC>γPI Vertical alignment
γLC<γPI Horizontal alignment

According to the FCK rule, whether the alignment of liquid crystal will be perpendicular or parallel to the alignment film can be predicted based on the magnitude relationship between the liquid crystal surface energy γLC and the alignment film surface energy γPI. Although the FCK rule is considered to be applicable to the relationship between the liquid crystal molecules 31 and the shape-anisotropic particles 32, the rule may not hold for cases where the anisotropy Δε of dielectric constant is significantly greater than the ordinary value, as in the case of the liquid crystal molecules 31 in the present embodiment. In the present embodiment, though the FCK rule does not hold, the liquid crystal molecules 31 can be aligned parallel to the surfaces of the shape-anisotropic particles 32 by adjusting the surface energies of the liquid crystal molecules 31 and the shape-anisotropic particles 32 within the above respective ranges. That is, although a larger surface energy of the shape-anisotropic particles 32 is more preferred to align the liquid crystal molecules 31 parallel to the surfaces of the shape-anisotropic particles 32 according to the FCK rule, the inventors have found that, in the case where the anisotropy Δε of dielectric constant of liquid crystal is significantly greater than the ordinary value, the surface energy of the shape-anisotropic particles 32 is preferably adjusted to a value equal to or less than the surface energy of the liquid crystal.

The shape-anisotropic particles 32 each contain a core material and a coating layer constituting the outer surface. The core material is preferably a metal core material (metal flake), for example, particularly preferably a lustrous metal. A metal core material having a layer of a natural oxide of the metal on its surface is also preferred as long as the core is apparently lustrous. The coating layer is formed of a material containing a fluorine atom. The material containing a fluorine atom is a material not dissolving in liquid crystal, and is preferably, for example, an insulating resin having a functional group (modifying group) that contains fluorine. The coating layer is used as a layer (modifying layer) that adjusts the surface energy of the shape-anisotropic particles 32 within the appropriate range. With such a structure in which the metal core material is covered with the coating layer, sufficient reflection performance can be achieved owing to the metal core material and the surface energy of the shape-anisotropic particles 32 can be adjusted using the coating layer. The thickness of the coating layer is, for example, about several tens to hundreds of nanometers.

The shape-anisotropic particles 32 may each include the coating layer formed directly on the surface of the core material or include a base layer on the surface of the core material and the coating layer formed on the surface of the base layer. The base layer may enhance the adhesion between the core material and the coating layer. Also, in order to control the alignment of the shape-anisotropic particles 32 by utilizing dielectrophoretic force, the difference in dielectric constant between the shape-anisotropic particles 32 and the liquid crystal is preferably large. In the case where a base layer is used, the dielectric constant of the base layer can be utilized to control the dielectric constant of the shape-anisotropic particles 32. Preferred examples of the base layer include inorganic layers, such as silicon dioxide ($SiO_2$) layers, and metal oxide layers. That is, the shape-anisotropic particles 32 may each include a metal oxide layer between the core material and the coating layer.

The specific density of the shape-anisotropic particles 32 is preferably about the same as that of the liquid crystal for avoidance of floating or precipitation in the liquid crystal layer 30.

The display principle of the optical modulator of the present embodiment is described below based on FIGS. 1(a) and 1(b). FIG. 1(a) illustrates a state where no voltage is applied between the electrodes 12a and 12b. In this state, the liquid crystal molecules 31 and the shape-anisotropic particles 32 are aligned perpendicular to the first substrate 10. For this reason, external light incident from the second substrate 20 side passes through the liquid crystal layer 30 to reach the light absorber 16, so that black display is achieved. The path of external light is indicated by an arrow in FIG. 1(a).

FIG. 1(b) illustrates a state where voltage is applied between the electrodes 12a and 12b. In this state, the liquid crystal molecules 31, which have a positive anisotropy of dielectric constant, are titled in a direction toward the alignment parallel to the first substrate 10 depending on the strength of the transverse electric fields. The shape-anisotropic particles 32 are tilted parallel to the first substrate 10 by the force of the nearby liquid crystal molecules 31 being realigned from the vertical alignment to the horizontal alignment. The shape-anisotropic particles 32 are preferably forced to the horizontal alignment not only by the alignment change of the nearby liquid crystal molecules 31 but also by the dielectrophoretic force generated in themselves. The dielectrophoretic force increases as the difference in dielectric constant between the media, namely the liquid crystal molecules 31 and the shape-anisotropic particles 32, increases. Accordingly, in order to achieve favorable switching performance, the difference in dielectric constant between the liquid crystal molecules 31 and the shape-anisotropic particles 32 is preferably large.

As the tilt of the shape-anisotropic particles 32 is increased by voltage application, the projected area of each of the shape-anisotropic particles 32 on the first substrate 10 is increased. As the projected area increases, the amount of external light reflected by the tilted shape-anisotropic particles 32 increases. Hence, half-tone display is provided when voltage applied between the electrodes 12a and 12b is relatively low, while white display is provided when a given voltage is applied between the electrodes. The path of external light is indicated by an arrow in FIG. 1(b).

The case of switching from the voltage-off state illustrated in FIG. 1(a) to the voltage-on state illustrated in FIG. 1(b) has been described above. The case of switching from the voltage-on state illustrated in FIG. 1(b) to the voltage-off state illustrated in FIG. 1(a) is the same except that the alignment change directions of the liquid crystal molecules 31 and the shape-anisotropic particles 32 are opposite. That is, since the alignment changes of the liquid crystal molecules 31 and the shape-anisotropic particles 32 are reversible by voltage application both in the case where the alignment is changed from the vertical alignment to the horizontal alignment and from the horizontal alignment to the vertical alignment, the response speed in the case of switching from black display to the white display can be the same as the response speed in the case of switching from the white display to the black display.

The optical modulator of the present embodiment can prevent aggregation of the shape-anisotropic particles. In the case of being used as a display device, the optical modulator also can prevent deterioration of display characteristics such as a reflectance and a response speed when no voltage is applied, which are caused by aggregation of shape-anisotropic particles.

The optical modulator of the present embodiment can control the reflectance of external light, which is natural light, by a display principle of changing the alignment of the shape-anisotropic particles 32. Therefore, unlike liquid crystal panels utilizing polarizers, the present embodiment requires no polarizer on the back surface side of the first substrate 10 and the front surface side of the second substrate 20. The optical modulator of the present embodiment therefore exhibits excellent light use efficiency.

Embodiment 2

An optical modulator of Embodiment 2 constitutes a transmissive display device utilizing light from a light source to provide display. The optical modulator provides white display with no voltage applied and provides black display with voltage applied. Differences from Embodiment 1 are mainly described below.

Figure 6:
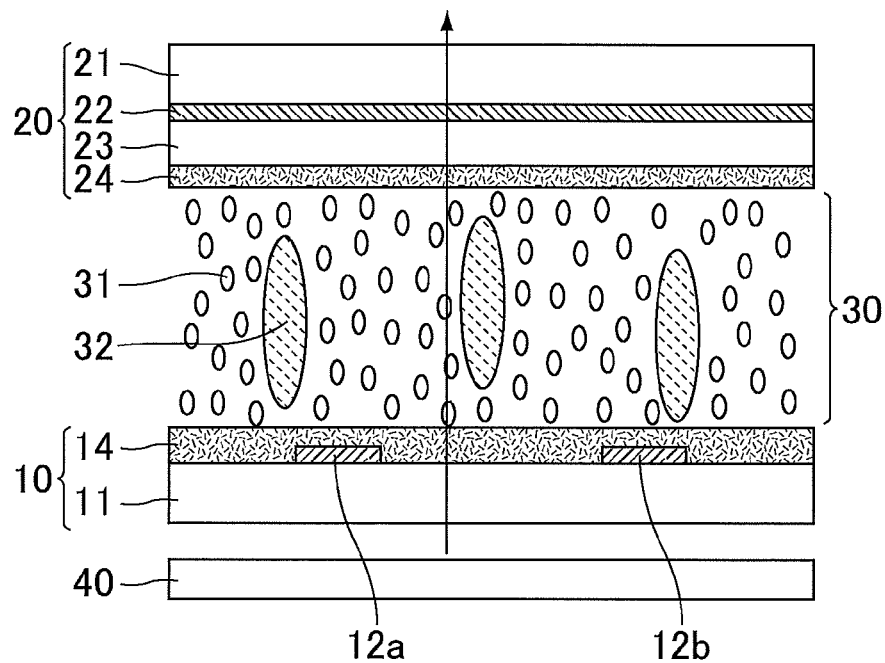
FIGS. 6(a) and 6(b) are each a schematic cross-sectional view of an optical modulator of Embodiment 2.
Figure 6:
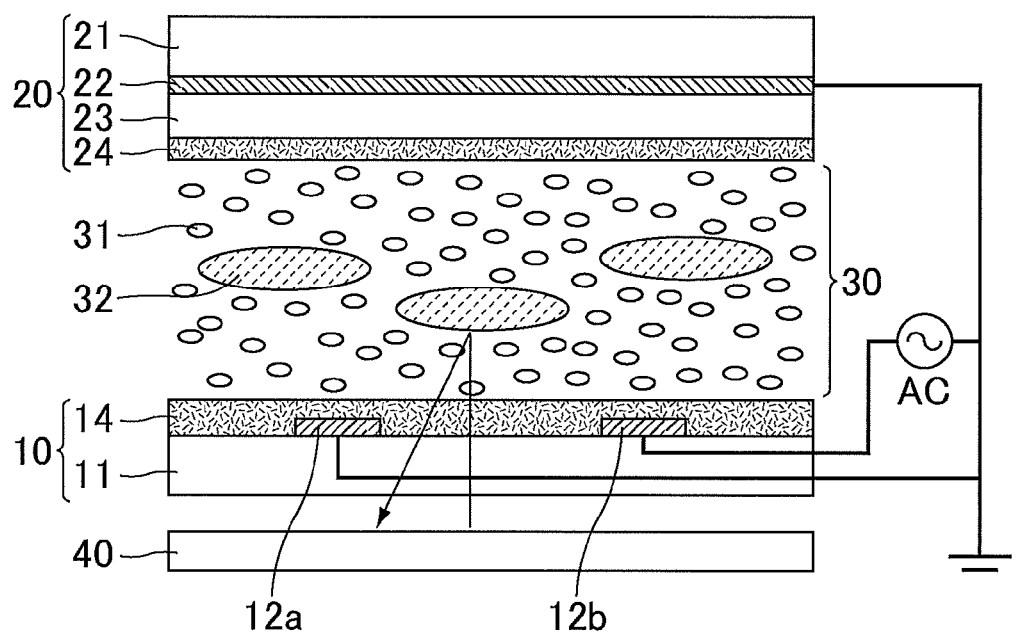

FIGS. 6(a) and 6(b) are each a schematic cross-sectional view of an optical modulator of Embodiment 2; FIG. 6(a) illustrates a voltage-off state and FIG. 6(b) illustrates a voltage-on state. As illustrated in FIGS. 6(a) and 6(b), the optical modulator of Embodiment 2 includes a light source (backlight) 40 on the back surface side of the first substrate 10. The liquid crystal layer 30 serving as an optical modulation layer controls transmission and reflection of light emitted by the light source 40. Thus, the optical modulator of Embodiment 2 is structurally different from the optical modulator of Embodiment 1 in that it includes the light source 40 and does not include the light absorber 16. Also, since the present embodiment utilizes light passing through the liquid crystal layer 30 to provide display, the pair of electrodes 12a and 12b is preferably formed of a transparent conductive material.

The light source 40 may be an edge-lit light source or a direct-lit light source. The light source may be of any type such as light emitting diodes (LEDs) or cold cathode fluorescent lamps (CCFLs).

FIG. 6(a) illustrates a state where no voltage is applied between the electrodes 12a and 12b. In this state, the liquid crystal molecules 31 and the shape-anisotropic particles 32 are aligned perpendicular to the first substrate 10. In this configuration, light that is emitted by the light source 40 and incident from the first substrate 10 side passes through the liquid crystal layer 30 and the second substrate 20, so that white display is achieved. The path of light emitted by the light source 40 is indicated by an arrow in FIG. 6(a).

FIG. 6(b) illustrates a state where voltage is applied between the electrodes 12a and 12b. In this state, the liquid crystal molecules 31 and the shape-anisotropic particles 32 are titled in a direction toward the alignment parallel to the first substrate 10 depending on the strength of the transverse electric fields. As the tilt of the shape-anisotropic particles 32 increases, the projected area of each of the shape-anisotropic particles 32 on the first substrate 10 increases. Hence, the tilted shape-anisotropic particles 32 reflect light emitted by the light source 40, so that black display is achieved. The path of light emitted by the light source 40 is indicated by an arrow in FIG. 6(b).

The optical modulator of the present embodiment can also prevent aggregation of the shape-anisotropic particles. In the case of being used as a display device, the optical modulator also can prevent deterioration of display characteristics such as a transmittance with no voltage applied and a response speed, which are caused by aggregation of shape-anisotropic particles.

The optical modulator of the present embodiment can control the reflectance of non-polarized light emitted by the light source, by a display principle of changing the alignment of the shape-anisotropic particles 32. Therefore, unlike liquid crystal panels utilizing polarized light, the present embodiment requires no polarizer on the back surface side of the first substrate 10 and the front surface side of the second substrate 20. Accordingly, the optical modulator of the present embodiment also exhibits excellent light use efficiency.

Embodiment 3

An optical modulator of Embodiment 3 has a similar configuration to the optical modulator of Embodiment 1, except that the electrode structure of the first substrate was changed from the IPS electrode structure to the fringe field switching (FFS) electrode structure. The FFS electrode structure can reduce short circuits between the paired electrodes disposed in the first substrate. The FFS electrode structure can also prevent, with its planar electrode, influence of external static electricity on the optical modulator.

Figure 7:
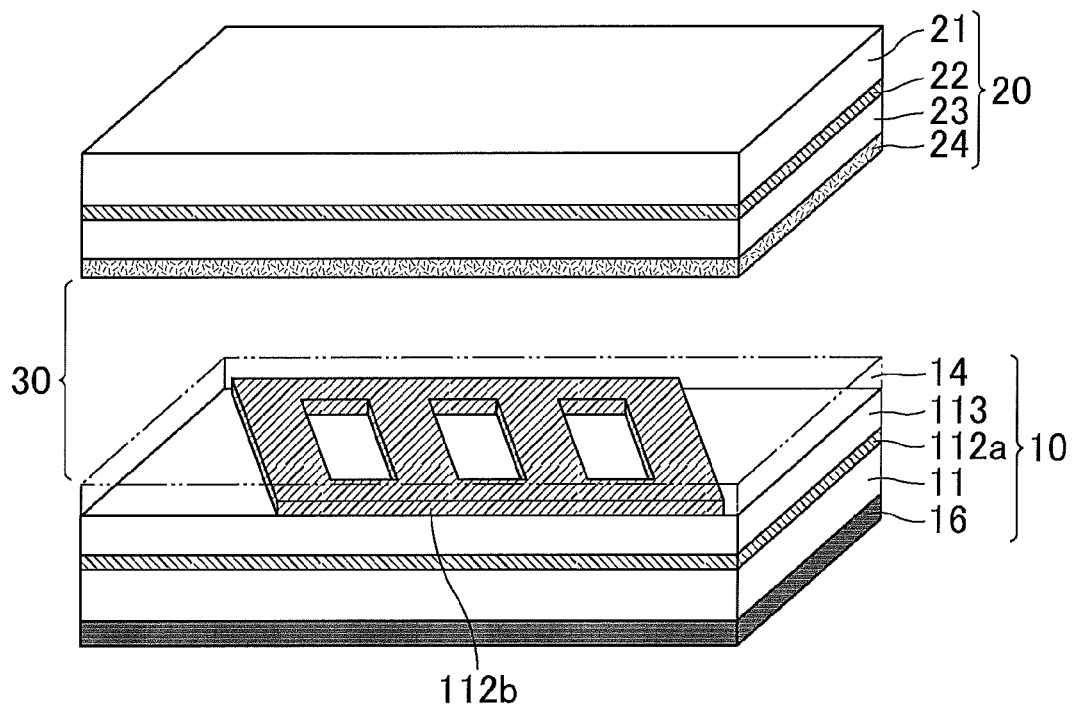
FIG. 7 is a schematic perspective view of an electrode structure in an optical modulator of Embodiment 3.

FIG. 7 is a schematic perspective view of an electrode structure in an optical modulator of Embodiment 3. As illustrated in FIG. 7, the optical modulator of Embodiment 3 includes, in the first substrate 10, a planar first electrode 112a and a second electrode 112b including parallel electrode slits (parts where no electrode is formed) are stacked with a dielectric layer (insulating film) 113 in between. The second electrode 112b having a planar shape includes linear openings each peripherally surrounded entirely by the electrode as slits, as illustrated in FIG. 7. The second electrode 112b may alternatively be a comb electrode including a trunk part and parallel branch parts (comb teeth) extending from the trunk part as illustrated in FIGS. 1(a) and 1(b) and FIG. 2.

The second electrode 112b is electrically connected to the drain electrode of the corresponding TFT arranged in the lower layer (on the supporting substrate 11 side) through a contact hole (not illustrated). The first electrode 112a is arranged to cover the entire surface of the first substrate 10 excluding the openings for contact hole formation. Applying voltage between the first electrode 112a and the second electrode 112b generates electric fields substantially parallel to the first substrate 10 in the liquid crystal layer 30 in the vicinity of the electrode slits. The "transverse electric field" as used herein encompasses substantial horizontal electric fields formed by the FFS electrode structure as well as horizontal electric fields formed by the IPS electrode structure.

The optical modulator of the present embodiment can also prevent aggregation of the shape-anisotropic particles. In the case of being used as a display device, the optical modulator also can prevent deterioration of display characteristics such as a reflectance with no voltage applied and a response speed, which are caused by aggregation of shape-anisotropic particles. In addition, the optical modulator of the present embodiment also requires no polarizers, thereby exhibiting excellent light use efficiency.

The embodiments of the present invention have been described. Each and every matter described above is applicable to all the aspects of the present invention. The present invention is described in more detail below with reference to examples.

Example 1

Flaky shape-anisotropic particles (hereinafter, also referred to as "flakes") were produced by fluorinating a flake material (core material) with a fluorine-based silane coupling agent, and the characteristics of the particles were evaluated. The materials used are listed below.

Fluorine-based silane coupling agent (modifier):
 (Heptadecafluoro-1,1,2,2-tetrahydrodecyl) dimethylethoxysilane (2 ml)
Solvent: Xylene (40 ml) and ethanol (10 ml)
Flake material: Aluminum flakes each having a 0.1-μm-thick $SiO_2$ layer on the surface (primary particles having an average maximum length of 10 μm and an average thickness of 0.3 μm)

The flake material (0.1 g) was added to a mixture of the modifier and the solvent, and the resulting mixture was reacted under ultrasonic irradiation at room temperature for four hours. To the obtained reaction solution was added xylene (100 ml), followed by filtration of the mixture with a 400-nm filter made of polyvinylidene fluoride (PVDF).

Chloroform (100 ml) was then added to the mixture, and the resulting mixture was filtrated by the same procedure. Chloroform was added to the residual flake material, and the resulting mixture was aliquoted. The aliquots were subjected to a series of processes including centrifugation, decantation, addition of chloroform, and ultrasonic irradiation in the given order for three times.

The aliquots were further subjected to a series of processes including centrifugation, decantation, addition of acetone, and ultrasonic irradiation in the given order for three times. Lastly, the aliquots were dried under reduced pressure, whereby fluorinated flakes A each including the flake material whose surface is fluorinated with the modifier were obtained.

(1) Determination of Surface Energy of Fluorine-Modified Layer

A substrate was prepared by forming an aluminum film having a thickness of 0.1 µm on a glass plate by vapor deposition, and forming an $SiO_2$ film having a thickness of 0.1 µm on the aluminum film by vapor deposition. The substrate was immersed in a mixed solution of the modifier and xylene (40 ml) for four hours. The substrate was then washed with chloroform and acetone, so that a substrate including a fluorine-modified layer was produced. The surface energy of this fluorine-modified layer determined by Zisman plotting was 12 mN/m. In contrast, the surface energy of the substrate before formation of the fluorine modified layer determined by the same procedure was 45 mN/m. The results show that the fluorine-modified layer decreases the surface energy of the shape-anisotropic particles.

(2) Determination of Dispersibility of Shape-Anisotropic Particles

The obtained fluorinated flakes A were put in liquid crystal ($\Delta\varepsilon=10$) and they were sufficiently mixed by ultrasonic irradiation. The mixture was left to stand for one day. Thereafter, the mixture was centrifuged at a low speed (300 rpm×30 seconds). The precipitated amount of the fluorinated flakes A was determined. Similarly, the precipitated amount of untreated flakes without fluorine modification of the flake material was determined. The results show that the precipitated amount of the untreated flakes was about 1.57 times that of the fluorinated flakes A. Here, the precipitated amount was determined by measuring the distance from the bottom of the centrifuge tube.

In the case where the affinity between the shape-anisotropic particles and the liquid crystal is low, aggregation of the shape-anisotropic particles proceeds to form heavy aggregates which are more likely to precipitate. The obtained results therefore show that the fluorinated flakes A have a higher affinity with the liquid crystal and higher dispersibility than the untreated flakes do. That is, as a result of a decrease in the surface energy by the fluorine modification, the aggregation of the shape-anisotropic particles in the liquid crystal was confirmed to be inhibited.

(3) Determination of Dispersibility in Cell

For evaluation of the dispersibility of the fluorinated flakes A in a cell, a cell containing a mixture of the obtained fluorinated flakes A and liquid crystal and a cell containing a mixture of untreated flakes and liquid crystal were produced. The cells each had the following specifications.

Liquid crystal: $\Delta\varepsilon=20.4$ ($\varepsilon_{//}=24.7$, $\varepsilon_\perp=3.4$), $\Delta n$ (anisotropy of refractive index)=0.1214, $T_{NI}$ (nematic phase-isotropic phase transition temperature)=94.5° C., γ (surface energy)=32.0 mN/m Flake content in liquid crystal: 5 wt %

Cell thickness: 15 µm

Electrodes in first substrate and second substrate: Both are ITO planar electrodes (solid electrode)

Alignment film: Vertical alignment film, γ (surface energy)=35.8 mN/m

Figure 8:
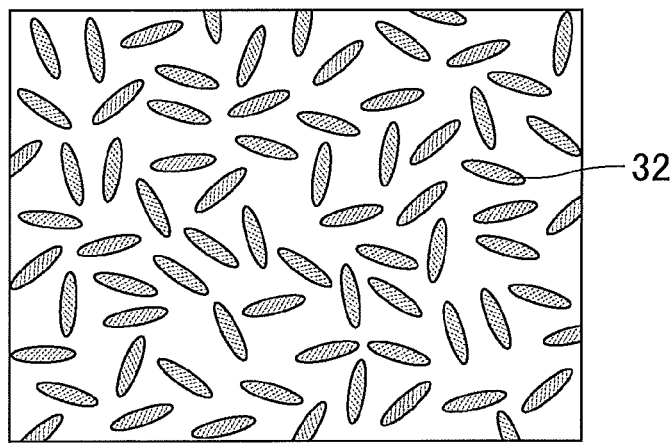
FIG. 8 schematically illustrates a dispersion state of fluorinated flakes A produced in Example 1 in liquid crystal.
Figure 9:
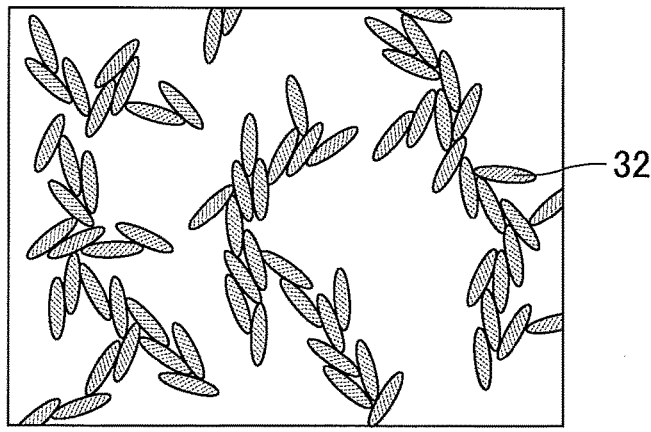
FIG. 9 schematically illustrates a dispersion state of untreated flakes in liquid crystal.

Twenty-four hours after the production of a cell, the cell was observed with an optical microscope at a magnification of 5×. The observation results are shown in FIG. 8 and FIG. 9. FIG. 8 schematically illustrates a dispersion state of the fluorinated flakes A produced in Example 1 in liquid crystal. FIG. 9 schematically illustrates a dispersion state of untreated flakes in liquid crystal. FIG. 8 and FIG. 9 each illustrate a state where the flakes are orientated in a normal direction of the viewing surface.

As is clear from FIG. 8 and FIG. 9, the fluorinated flakes A were less aggregated and had higher dispersibility than the untreated flakes.

(4) Determination of Cell Characteristics

For determination of the characteristics of the cell utilizing the fluorinated flakes A, a cell containing a mixture of the obtained fluorinated flakes A and liquid crystal and a cell containing a mixture of untreated flakes and liquid crystal were produced. The cells each had the following specifications.

Liquid crystal: $\Delta\varepsilon=20.4$ ($\varepsilon_{//}=24.7$, $\varepsilon_\perp=3.4$), $\Delta n=0.1214$, $T_{NI}=94.5°$ C., γ=32.0 mN/m Flake content in liquid crystal: 5 wt %

Cell thickness: 15 µm

First electrode: Pair of ITO comb electrodes with electrode width of 4 µm and electrode space of 4 µm Electrode in second substrate: None Alignment film: Vertical alignment film, γ (surface energy)=35.8 mN/m The response speed, reflectance, and flake density of the obtained cells were measured under the following conditions. The results are shown in the following Table 1.

(4-1) Response Speed

The time required for the relative transmittance (normalized transmittance) to increase from 10% to 90%, with the maximum transmittance taken as 100%, when 20 V (Vpp) was applied between the comb electrodes was measured.

(4-2) Reflectance

Light incident on the cell from a D65 light source was reflected, and the reflected light was measured in a specular component excluded mode (SCE mode) at a viewing angle of 2°.

(4-3) Flake Density

Twenty-four hours after the production of a cell, the cell was observed with a 10× optical microscope. The observation was performed at three sites in the cell, and the number of particles present in a 2-mm-square region was counted at each site. In the case where aggregates formed by aggregation of flakes were observed, the number of flakes constituting the aggregates was not counted but the number of the aggregates was counted by taking each aggregate as one particle. That is, one aggregate was counted as one particle.

TABLE 1

| | Response speed (ms) | Reflectance (%) | Flake density (particles/4 mm$^2$) |
|---|---|---|---|
| Fluorinated flakes A | 127 | 32.3 | 1231 |
| Untreated flakes | 235 | 22.7 | 752 |

(5) Summary of Example 1

Fluorine modification of flakes (shape-anisotropic particles) enabled increase in the dispersibility of the flakes in liquid crystal. As a result, the following effects 1 to 3 were obtained.

Effect 1: Increase In Response Speed

Aggregation of flakes increases the weight per particle, which decreases the response speed. Accordingly, a mixture with a larger number of aggregated flakes tended to give a low average response speed. High dispersion increased the proportion of light particles, increasing the overall response speed.

Effect 2: Increase in Reflectance

Aggregated flakes each had a large cross-sectional area to unfortunately cause bright point defects, which was a cause of the decrease in reflectance. High dispersion decreased the number of aggregated flakes, resulting in reduction in the bright point defects. Thereby, the overall reflectance increased.

Effect 3: Increase in the Number of Flakes

Aggregation of flake decreases the total number of particles.

In addition to Effects 1 to 3, effects such as reduction in image sticking and reduction in precipitation due to the force of gravity are expected.

Example 1-A1

A cell containing a mixture of the fluorinated flakes A and liquid crystal was produced and the characteristics of the cell were determined by similar procedures to those in Example 1, except that the liquid crystal had $\Delta\varepsilon=19.8$ ($\varepsilon//=23.0$, $\varepsilon\perp=3.2$) and $\gamma=34.8$ mN/m. As a result, the response speed was 185 ms, the reflectance was 27.5%, and the number of flakes was 811.

Example 1-A2

A cell containing a mixture of the fluorinated flakes A and liquid crystal was produced and the characteristics of the cell were determined by similar procedures to those in Example 1, except that the liquid crystal had $\Delta\varepsilon=22.4$ ($\varepsilon//=25.4$, $\varepsilon\perp=3.0$) and $\gamma=27.3$ mN/m. As a result, the response speed was 173 ms, the reflectance was 28.3%, and the number of flakes was 955.

Comparative Example 1-A1

A cell containing a mixture of the fluorinated flakes A and liquid crystal was produced and the characteristics of the cell were determined by similar procedures to those in Example 1, except that the liquid crystal had $\Delta\varepsilon=19.9$ ($\varepsilon//=23.2$, $\varepsilon\perp=3.3$) and $\gamma=35.2$ mN/m. As a result, the response speed was 230 ms, the reflectance was 22.9%, and the number of flakes was 786.

Comparative Example 1-A2

A cell containing a mixture of the fluorinated flakes A and liquid crystal was produced and the characteristics of the cell were determined by similar procedures to those in Example 1, except that the liquid crystal had $\Delta\varepsilon=23.5$ ($\varepsilon//=26.4$, $\varepsilon\perp=2.9$) and $\gamma=26.8$ mN/m. As a result, the response speed was 224 ms, the reflectance was 23.1%, and the number of flakes was 783.

Example 1-B1

A cell containing a mixture of the fluorinated flakes A and liquid crystal was produced and the characteristics of the cell were determined by similar procedures to those in Example 1, except that a vertical alignment film having $\gamma=39.7$ mN/m was used. As a result, the response speed was 180 ms, the reflectance was 27.1%, and the number of flakes was 793.

Example 1-B2

A cell containing a mixture of the fluorinated flakes A and liquid crystal was produced and the characteristics of the cell were determined by similar procedures to those in Example 1, except that a vertical alignment film having $\gamma=30.2$ mN/m was used. As a result, the response speed was 169 ms, the reflectance was 28.5%, and the number of flakes was 982.

Comparative Example 1-B1

A cell containing a mixture of the fluorinated flakes A and liquid crystal was produced and the characteristics of the cell were determined by similar procedures to those in Example 1, except that a vertical alignment film having $\gamma=40.3$ mN/m was used. As a result, the response speed was 232 ms, the reflectance was 22.8%, and the number of flakes was 766.

Comparative Example 1-B2

A cell containing a mixture of the fluorinated flakes A and liquid crystal was produced and the characteristics of the cell were determined by similar procedures to those in Example 1, except that a vertical alignment film having $\gamma=29.8$ mN/m was used. As a result, the response speed was 193 ms, the reflectance was 24.3%, and the number of flakes was 815.

Example 2

The flake material was fluorine-modified with a different fluorine-based silane coupling agent from the agent used in Example 1. The materials used are listed below.

Fluorine-based silane coupling agent (modifier): Pentafluorohexydimethylchlorosilane (2 ml)

Solvent: Ethanol (40 ml)

Flake material (core material): Aluminum flakes each having a 0.1-µm-thick $SiO_2$ layer on the surface (primary particles having an average maximum length of 10 µm and an average thickness of 0.3 µm)

The flake material (0.1 g) was added to a mixture of the modifier and ethanol, and the resulting mixture was reacted under ultrasonic irradiation at room temperature for four hours. The mixture was sequentially filtrated using ethanol, acetone, and chloroform with a 400-nm filter made of PVDF. Chloroform was added to the residual flake material, and the resulting mixture was aliquoted. The aliquots were subjected to a series of processes including centrifugation, decantation, addition of chloroform, and ultrasonic irradiation in the given order for three times. The aliquots were further subjected to a series of processes including centrifugation, decantation, addition of acetone, and ultrasonic irradiation in the given order for three times. Lastly, the aliquots were dried under reduced pressure, whereby fluorinated flakes B each including the flake material whose surface is fluorinated with the modifier were obtained.

(1) Determination of Surface Energy of Fluorine-Modified Layer

The surface energy of the fluorinated flakes B was measured by a similar procedure to that in Example 1 except that the modifier was changed. The obtained surface energy was 14 mN/m.

(2) Determination of Dispersibility of Shape-Anisotropic Particles

The precipitated amount of the fluorinated flakes B was determined by precipitation as in Example 1. The results show that the precipitated amount of the untreated flakes was about 1.45 times that of the fluorinated flakes B. Hence, the fluorinated flakes B were confirmed to have a higher affinity with the liquid crystal than the untreated flakes did.

(3) Determination of Cell Characteristics

A cell containing a mixture of the fluorinated flakes B and liquid crystal was produced and the characteristics of the cell were determined by similar procedures to those in Example 1. As a result, the response speed was 169 ms, the reflectance was 29.4%, and the number of flakes was 1046.

Example 3

The flake material was fluorine-modified with a siloxane-based polymer. The materials used are listed below.

Siloxane-based polymer (modifier): Siloxane polymer having a trifluoromethyl propyl group (molecular weight: about 5000) (1.8 ml)
Solvent: Methanol (40 ml) and ethanol (10 ml)
Flake material (core material): Aluminum flakes each having a 0.1-μm-thick $SiO_2$ layer on the surface (primary particles having an average maximum length of 10 μm and an average thickness of 0.3 μm)

The flake material (0.1 g) was added to a mixture of the modifier and the solvent, and the resulting mixture was reacted under ultrasonic irradiation at room temperature for four hours. The mixture was sequentially filtrated using methanol, acetone, and chloroform with a 400-nm filter made of PVDF. Methanol was then added to the residual flake material, and the resulting mixture was aliquoted. The aliquots were subjected to a series of processes including centrifugation, decantation, addition of methanol, and ultrasonic irradiation in the given order for three times. The aliquots were dried under reduced pressure, and heated at 100° C. for two hours. The aliquots were further subjected to a series of processes including centrifugation, decantation, addition of acetone, and ultrasonic irradiation in the given order for three times. Lastly, the aliquots were dried under reduced pressure, whereby fluorinated flakes C each including the flake material whose surface is fluorinated with the modifier were obtained.

(1) Determination of Surface Energy of Fluorine-Modified Layer

The surface energy of the fluorinated flakes C was measured by a similar procedure to that in Example 1 except that the modifier was changed. The obtained surface energy was 10 mN/m.

(2) Determination of Dispersibility of Shape-Anisotropic Particles

The precipitated amount of the fluorinated flakes C was determined by precipitation as in Example 1. The results show that the precipitated amount of the untreated flakes was about 1.62 times that of the fluorinated flakes C. Hence, the fluorinated flakes C were confirmed to have a higher affinity with the liquid crystal than the untreated flakes did.

(3) Determination of Cell Characteristics

A cell containing a mixture of the fluorinated flakes C and liquid crystal was produced and the characteristics of the cell were determined by similar procedures to those in Example 1. As a result, the response speed was 115 ms, the reflectance was 36.1%, and the number of flakes was 1315.

Example 4

A polymer layer (coating layer) was formed on the surface of a flake material (core material). The surface of the polymer layer was then fluorine-modified with a fluorine-based silane coupling agent. The polymer layer was formed by the following procedure.

Hydroxypropyl cellulose having a molecular weight of 20000 (20 g), methacrylic acid (5 g), azobisisobutyronitrile (AIBN) (0.2 g), and aluminum flakes (primary particles having an average maximum length of 10 μm and an average thickness of 0.3 μm) (2 g) were added to methanol (200 ml), and the resulting mixture was reacted under nitrogen stream at 60° C. for two hours. The mixture was then aliquoted. The aliquots were subjected a series of processes including centrifugation, decantation, addition of acetone, and ultrasonic irradiation in the given order for five times, and dried under reduced pressure, so that a flake material coated with a hydrophilic polymer was obtained.

The flake material was fluorine-modified by the following procedure.

The flake material coated with a hydrophilic polymer (0.1 g) was added to a mixture of pentafluorohexydimethylchlorosilane (modifier, 2 ml) and xylene (solvent, 40 ml), and the resulting mixture was reacted under ultrasonic irradiation at room temperature for four hours. The mixture was then filtrated using xylene and chloroform with a 400-nm filter (PVDF). Chloroform was added to the residual flake material, and the resulting mixture was aliquoted. The aliquots were subjected to a series of processes including centrifugation, decantation, addition of chloroform, and ultrasonic irradiation in the given order for three times. The aliquots were then further subjected to a series of processes including centrifugation, decantation, addition of acetone, and ultrasonic irradiation in the given order for three times. Lastly, the aliquots were dried under reduced pressure, whereby fluorinated flakes D each including the flake material whose surface is fluorinated with the modifier were obtained.

(1) Determination of Surface Energy of Fluorine-Modified Layer

The surface energy of the fluorinated flakes D was measured by a similar procedure to that in Example 1 except that the modifier was changed. The obtained surface energy was 13 mN/m.

(2) Determination of Dispersibility of Shape-Anisotropic Particles

The precipitated amount of the fluorinated flakes D was determined by precipitation as in Example 1. The results show that the precipitated amount of the untreated flakes was about 1.51 times that of the fluorinated flakes D. Hence, the fluorinated flakes D were confirmed to have a higher affinity with the liquid crystal than the untreated flakes did.

(3) Determination of Cell Characteristics

A cell containing a mixture of the fluorinated flakes D and liquid crystal was produced and the characteristics of the cell were determined by similar procedures to those in Example 1. As a result, the response speed was 140 ms, the reflectance was 30.9%, and the number of flakes was 1180.

Example 5

The flake material was fluorine-modified under supercritical ($CO_2$) conditions. The materials used are listed below.
Modifier: (Heptadecafluoro-1,1,2,2-tetrahydrodecyl)dimethylethoxysilane and methanol (0.1 ml)
Flake material (core material): Aluminum flakes each having a 0.1-μm-thick $SiO_2$ layer on the surface (primary particles having an average maximum length of 10 μm and an average thickness of 0.3 μm)

The flake material (0.1 g), the modifier (0.1 ml), and liquefied $CO_2$ (in an amount giving a total amount of 6 g)

were fed into a 50-ml autoclave. The autoclave door was closed tightly to increase the temperature inside and produce a supercritical condition (40° C., 7.3 MPa), where the reaction was then allowed to proceed for 0.5 hours. After that, the temperature and the pressure were dropped to the normal levels. Subsequently, the mixture was filtrated using methanol, acetone, and chloroform with a 400-nm filter (PVDF). Chloroform was then added to the residual flakes, and the mixture was aliquoted. The aliquots were subjected to a series of processes including centrifugation, decantation, addition of ethanol, and ultrasonic irradiation in the given order for three times. The aliquots were further subjected to a series of processes including centrifugation, decantation, addition of acetone, and ultrasonic irradiation in the given order for three times. Lastly, the aliquots were dried under reduced pressure, whereby fluorinated flakes E each including the flake material whose surface is fluorinated with the modifier were obtained.

(1) Determination of Surface Energy of Fluorine-Modified Layer

The surface energy of the fluorinated flakes E was measured by a similar procedure to that in Example 1 except that the modifier was changed. The obtained surface energy was 8 mN/m.

(2) Determination of Dispersibility of Shape-Anisotropic Particles

The precipitated amount of the fluorinated flakes E was determined by precipitation as in Example 1. The results show that the precipitated amount of the untreated flakes was about 1.73 times that of the fluorinated flakes E. Hence, the fluorinated flakes E were confirmed to have a higher affinity with the liquid crystal than the untreated flakes did.

(3) Determination of Cell Characteristics

A cell containing a mixture of the fluorinated flakes E and liquid crystal was produced and the characteristics of the cell were determined by similar procedures to those in Example 1. As a result, the response speed was 98 ms, the reflectance was 44.7%, and the number of flakes was 1528.

Summary of Examples

Figure 10:
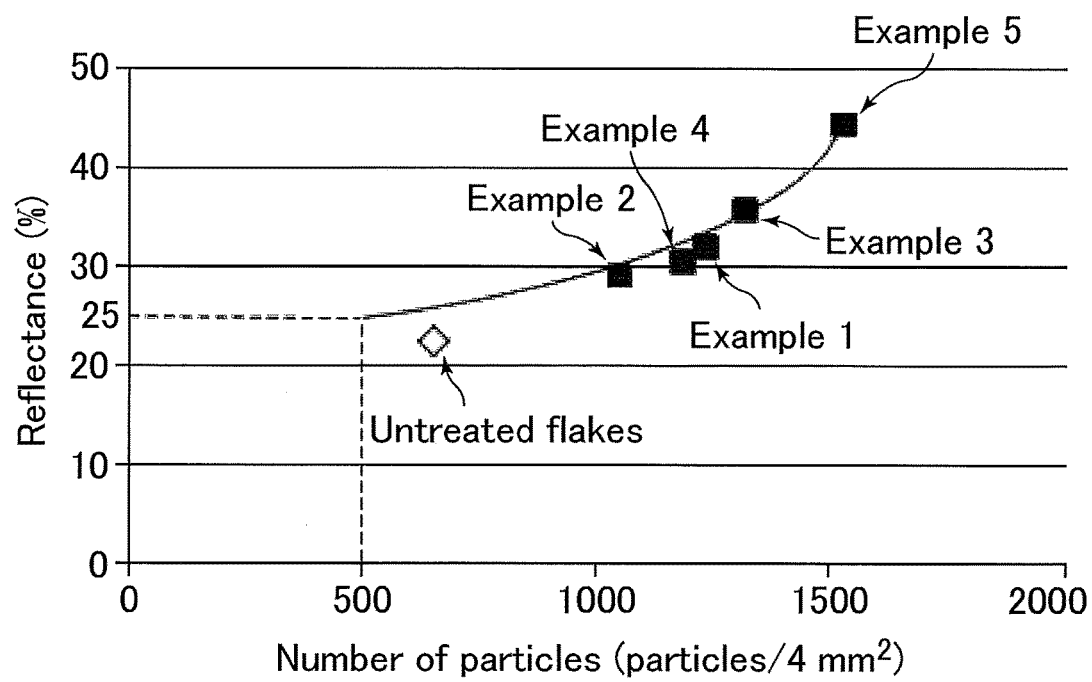
FIG. 10 is a graph showing the correlation between the flake dispersion density and the reflectance for the fluorinated flakes A to E in Examples 1 to 5 and untreated flakes.

FIG. 10 is a graph showing the correlation between the flake dispersion density and the reflectance for the fluorinated flakes A to E in Examples 1 to 5 and untreated flakes. In FIG. 10, the dispersion density of the flakes is indicated as the number of particles contained in a 2-mm-square (=4 mm$^2$) region (see the horizontal axis of the graph). The number of particles was counted by microscopic observation of a top view of the substrate surface. That is, the number of particles was counted by projecting each particle on the substrate surface. The observation was performed at three sites on the substrate surface, and the number of particles indicated in FIG. 10 is the average of the numbers obtained at the three sites.

In consideration of the display visibility, a reflectance of 25% or higher is desired. As shown in the graph in FIG. 10, the reflectance was lower than 25% in the case where untreated flakes which were not fluorinated were used. In contrast, in every case where one of the fluorinated flakes A to E in Examples 1 to 5 was used, a reflectance of 25% or higher was achieved. Also, the results show that as the dispersion density of the fluorinated flakes increases, the reflectance significantly increases. With a reflectance of 30% or higher, the visibility can be significantly improved.

In FIG. 10, the reflectance increases significantly as the dispersion density of the fluorinated flakes increases. This suggests that the display quality, especially the reflectance, deteriorates significantly when a large number of aggregated flakes are present. In other words, an increase in the number of aggregated flakes inhibits movement of each flake and widens the regions without flakes, thereby significantly decreasing the reflectance. In contrast, an increase in the number of flakes separately distributed without aggregation increases the number of smoothly movable flakes and reduces the region without flakes, thereby synergically increasing the reflectance.

[Additional Remarks]

One aspect of the present invention may be an optical modulator, including: a first substrate and a second substrate that are disposed to face each other; an optical modulation layer disposed between the first substrate and the second substrate; and a vertical alignment film disposed on an optical modulation layer side surface of at least one of the first substrate and the second substrate, the optical modulation layer containing shape-anisotropic particles and liquid crystal molecules that have a positive anisotropy of dielectric constant with a value of the anisotropy Δε of 10 or more, the shape-anisotropic particles each including a core material and a coating layer that is formed of a material containing a fluorine atom and constitutes an outer surface of the shape-anisotropic particles, the first substrate including a pair of electrodes, the liquid crystal molecules and the shape-anisotropic particles being aligned perpendicular to the first substrate with no voltage applied to the electrodes and being tilted parallel to the first substrate by a transverse electric field generated by application of voltage to the electrodes, the liquid crystal molecules having a surface energy in the range of 27 to 35 mN/m, the vertical alignment film having a surface energy in the range of 30 to 40 mN/m.

The optical modulator of the above aspect can prevent aggregation of the shape-anisotropic particles. In the case of being used as a display device, the optical modulator can also prevent deterioration of display characteristics such as a reflectance (in the case of a reflective display device), a transmittance (in the case of a transmissive display device) and a response speed, which are caused by aggregation of shape-anisotropic particles.

The shape-anisotropic particles may each include an inorganic oxide layer between the core material and the coating layer. The inorganic oxide layer can increase the difference in dielectric constant between the liquid crystal and the shape-anisotropic particles, leading to a favorable switching characteristic.

The coating layer preferably contains a functional group containing fluorine. Such a coating layer enables easy control of the surface energy of the shape-anisotropic particles within a favorable range.

In a projected image on a surface of the first substrate, the shape-anisotropic particles are preferably dispersed in the optical modulation layer at a density of 500 particles/4 mm$^2$ or higher. In this state, aggregation of the shape-anisotropic particles is effectively prevented, so that a high reflectance (in the case of reflective display device) or a high transmittance (in the case of transmissive display device) can be achieved.

The pair of electrodes may have an IPS electrode structure or an FFS electrode structure. The pair of electrodes, in the case of having an IPS electrode structure, is a pair of comb electrodes whose comb teeth fit each other. The pair of electrodes, in the case of having an FFS electrode structure, is a combination of a planar electrode and an electrode including slits. Both the IPS electrode structure and the FFS electrode structure can generate transverse electric fields in the optical modulation layer, and thereby horizontally align the liquid crystal and the shape-anisotropic particles. Also, the IPS electrode structure can reduce the number of layers constituting the first substrate, thereby reducing the number of steps required in formation of the layers and in patterning. Meanwhile, the FFS electrode structure can reduce short circuits between the electrodes, and can prevent, with its planar electrode, influence of external static electricity on the optical modulator.

The second substrate may include a planar electrode that faces the pair of electrodes. With a planar electrode disposed in the second substrate, a vertical electric field can be generated in the optical modulation layer. The optical modulator of the present invention can be driven by transverse electric fields alone, but may be driven by electric fields including vertical electric fields as necessary. For example, generation of vertical electric fields is effective for purposes such as resetting hysteresis, resetting flake alignment disorder caused by external damage or any other factor, or electric field assistance for high speed response.

Another aspect of the present invention may be a display device including the optical modulator described above. The display device of the above aspect can prevent deterioration of display characteristics such as a reflectance (in the case of a reflective display device), a transmittance (in the case of a transmissive display device) and a response speed, which are caused by aggregation of shape-anisotropic particles.

The display device, with the transverse electric field generated, preferably provides display by utilizing the shape-anisotropic particles to reflect external light. Such a configuration enables display in a transmissive mode or a transflective mode (mode in which a transmissive mode and a reflective mode are used in combination).

One of the first substrate and the second substrate disposed on the back surface side preferably includes a light-absorbing layer. With a light-absorbing layer disposed on the back surface side of the substrate, the contrast ratio in reflective mode display can be increased.

REFERENCE SIGNS LIST

10: First substrate
11, 21: Supporting substrate
12a, 12b: Electrode
14, 24: Vertical alignment film
16: Light absorber
20: Second substrate
22: Counter electrode
23: Insulating film
30: Liquid crystal layer
31: Liquid crystal molecule
32: Shape-anisotropic particle
40: Light source
112a: First electrode
112b: Second electrode
113: Dielectric layer

The invention claimed is:

1. An optical modulator, comprising:
a first substrate and a second substrate that are disposed to face each other;
an optical modulation layer disposed between the first substrate and the second substrate; and
a vertical alignment film disposed on an optical modulation layer side surface of at least one of the first substrate and the second substrate,
the optical modulation layer containing shape-anisotropic particles and liquid crystal molecules that have a positive anisotropy of dielectric constant with a value of the anisotropy $\Delta\varepsilon$ of 10 or more,
the shape-anisotropic particles each including a core material and a coating layer that is formed of a material containing a fluorine atom and constitutes an outer surface of the shape-anisotropic particles,
the first substrate including a pair of electrodes,
the liquid crystal molecules and the shape-anisotropic particles being aligned perpendicular to the first substrate with no voltage applied to the electrodes and being tilted parallel to the first substrate by a transverse electric field generated by application of voltage to the electrodes,
the liquid crystal molecules having a surface energy in the range of 27 to 35 mN/m,
the vertical alignment film having a surface energy in the range of 30 to 40 mN/m
wherein in a projected image on a surface of the first substrate, the shape-anisotropic particles are dispersed in the optical modulation layer at a density of 500 particles/4 mm$^2$ or higher.

2. The optical modulator according to claim 1, wherein the shape-anisotropic particles each include an inorganic oxide layer between the core material and the coating layer.

3. The optical modulator according to claim 1, wherein the coating layer contains a functional group containing fluorine.

4. The optical modulator according to claim 1, wherein the pair of electrodes is a pair of comb electrodes whose comb teeth fit each other.

5. The optical modulator according to claim 1, wherein the pair of electrodes is a combination of a planar electrode and an electrode including slits.

6. A display device comprising the optical modulator according to claim 1.

7. The display device according to claim 6, wherein the display device, with the transverse electric field generated, provides display by utilizing the shape-anisotropic particles to reflect external light.

8. The display device according to claim 7, wherein one of the first substrate and the second substrate disposed on the back surface side includes a light-absorbing layer.

* * * * *